2 Sheets. Sheet 2.
J. W. Brown,
Gas Apparatus.
No 82,080.  Patented Sep. 15. 1868.
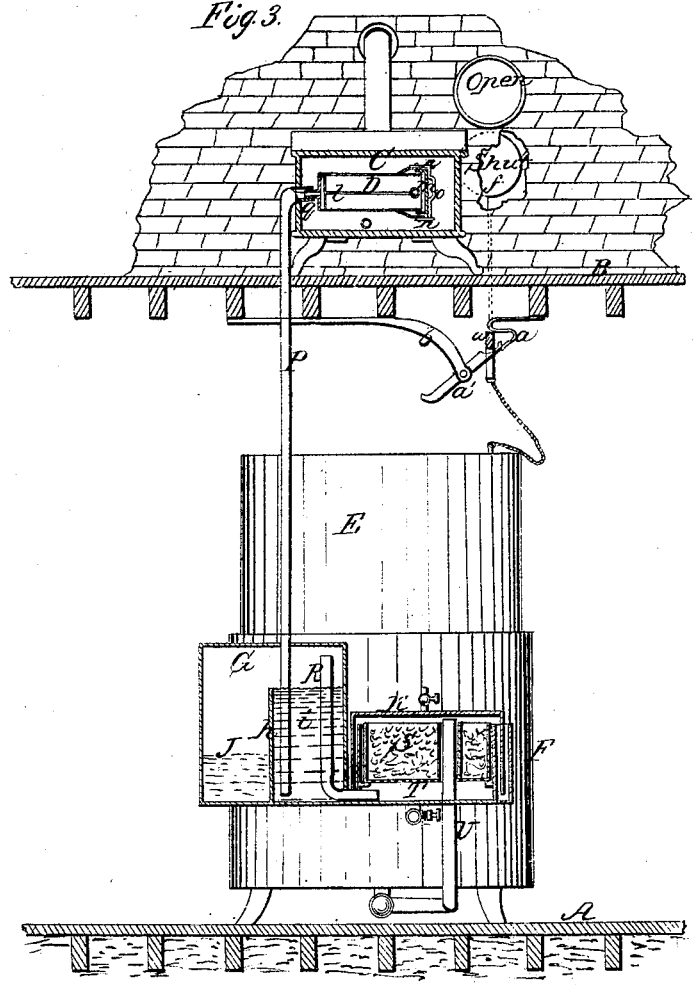
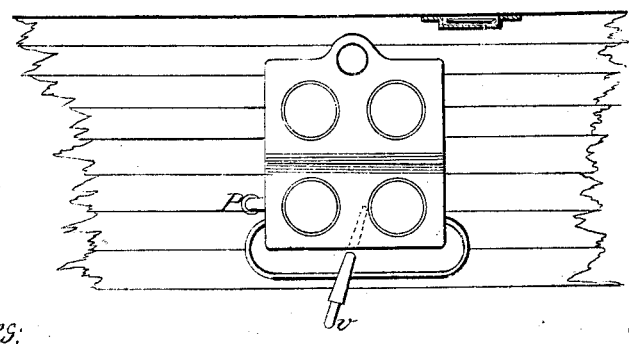
Witnesses:
Alex F. Roberts.
G. C. Cotton.
Inventor,
John W. Brown
per Munn & Co
Attorneys

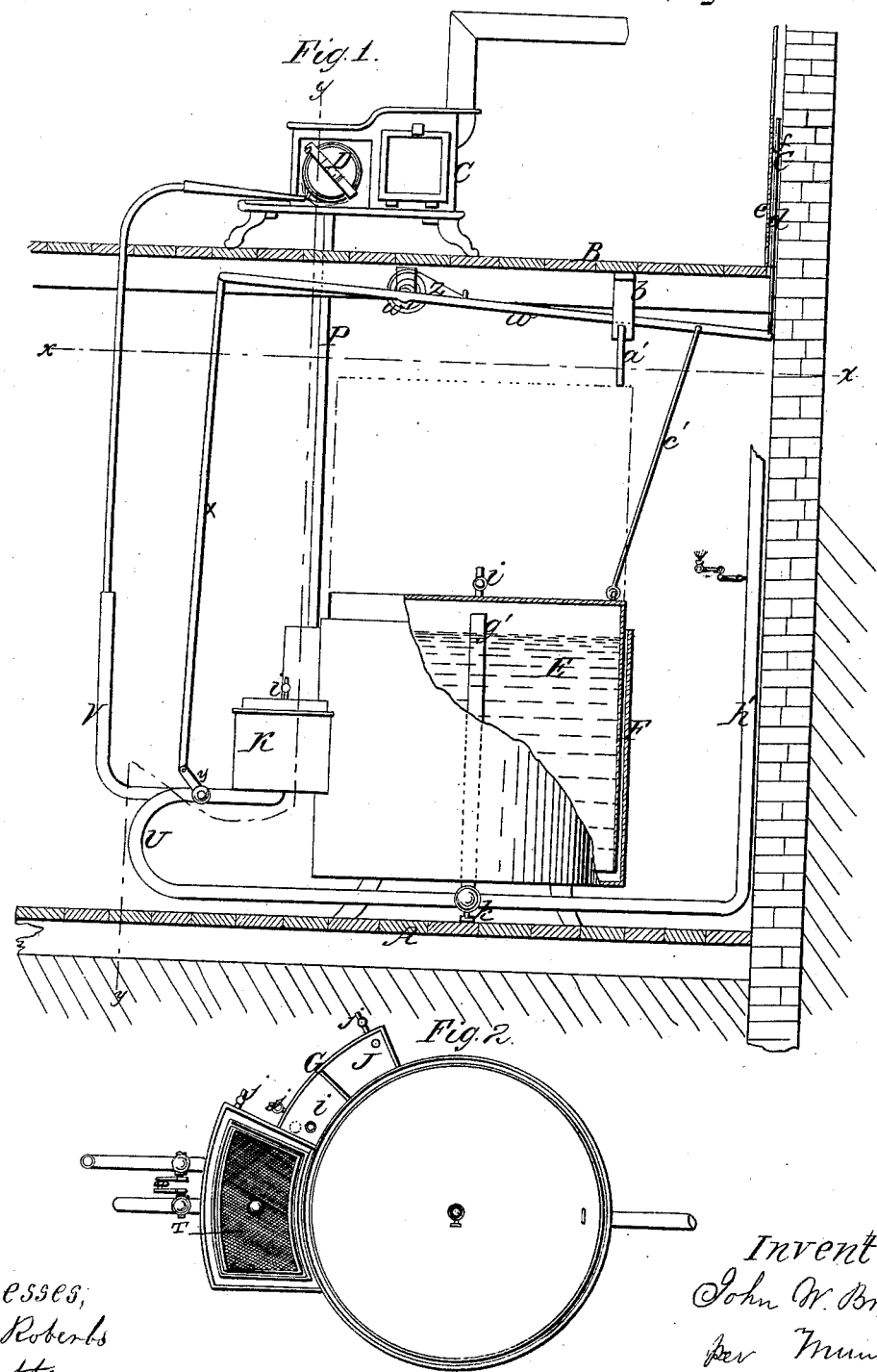

United States Patent Office.

JOHN W. BROWN, OF WOOSTER, OHIO.

Letters Patent No. 82,080, dated September 15, 1868.

IMPROVED APPARATUS FOR DOMESTIC MANUFACTURE OF GAS.

*The Schedule referred to in these Letters Patent and making part of the same.*

TO ALL WHOM IT MAY CONCERN:

Be it known that I, JOHN W. BROWN, of Wooster, in the county of Wayne, and State of Ohio, have invented a new and improved Gas-Apparatus; and I do hereby declare that the following is a full, clear, and exact description thereof, which will enable those skilled in the art to make and use the same, reference being had to the accompanying drawings, forming part of this specification.

This invention relates to improvements in apparatus for generating and purifying coal-gas for illuminating and other purposes, whereby the apparatus is adapted to household or domestic use, and whereby the flow of gas to the gas-holder is regulated automatically, and surplus gas used as fuel.

And the invention consists in the construction, arrangement, and combination of parts, as will hereinafter be more fully described.

Figure 1 represents a vertical elevation of the apparatus, showing the generating part and retort on an upper floor, and the gas-holder and purifying part on a lower floor, or in a basement or cellar of a building.

Figure 2 is a horizontal section, the view being taken from the line $x$ $x$ of fig. 1.

Figure 3 is a vertical section of fig. 1, through the line $y$ $y$.

Figure 4 is a top or plan view of the generator.

Similar letters of reference indicate corresponding parts.

This apparatus consists of a retort, a gas-washer and purifier, with a receptacle for the coal-tar in combination with the washer, and a gas-holder, operating in a water-cistern, in the ordinary manner, by the pressure of the gas.

In this example of my invention, the apparatus is represented as adapted to a dwelling, with the retort receiving its heat for the generation of the gas from the cooking-stove.

But it is designed also for all public buildings, steamboats, and all locations where the necessary heat for generating the gas can be obtained, the object being to construct a perfect gas-apparatus, adapted to domestic use, and to other uses, as before mentioned.

A represents the floor of a basement or cellar, and

B the floor of an upper room or apartment.

C is a stove, which contains the retort for generating the gas.

D represents the retort.

E is the gas-holder.

F is the cistern.

G represents the washer and tar-receptacle, which is, in fact, a single vessel, with a partition, $h$, which divides the lower portion into two parts, $i$ being the washer, and filled with water, and J the tar-receptacle.

K is the purifier, which is formed with double walls or sides, which contain a vessel, with a perforated bottom, for holding lime, beneath which the gas enters the purifier, and is brought in contact with the lime or other purifying-article.

The retort is made detachable for filling and other purposes.

It contains a rake or a rod, with fingers on its back end, for removing the coke, when it is necessary to refill the retort. This rake is marked $l$.

The cover $m$ of the retort is made with a flange, which enters a groove around the outside of the retort, where it is made tight by clay, and secured by latches $n$ $n$.

The cover is also provided with a handle, $o$, for convenience in handling the retort.

The gas is discharged from the back end of the retort into the pipe P through the neck-pipe $q$, the joint being secured and rendered gas-tight by a collar, or in any suitable manner.

The gas is discharged from the pipe P, near the bottom of the washer, as seen in the drawing.

The tar and refuse matter which escape from the retort with the gas, float on the surface of the water in the washer, and run over the top of the partition $h$ into the tar-receptacle J, as seen.

R is a pipe, which conveys the gas from the washer into the purifier.

S indicates the lime in the purifying-vessel, and

T is the perforated bottom, before mentioned.

U is the pipe which conveys the gas from the purifier into the gas-holder.

The gas enters the pipe U near the top of the purifier, above the lime, as seen in the drawing.

The top of the purifier is provided with a deep flange on its under side, which sets down into the annular space between the double wall, which space being filled with water, or other liquid, renders the purifier at all times gas-tight.

Attached to the bottom of the purifier, there is another pipe, V, by which gas may be conveyed to the fire beneath the retort, and used as fuel, without being passed through the purifier.

This use of the gas as fuel occurs only when a surplus is generated, and the pressure in the gas-holder becomes too great.

The pressure is regulated by an automatic arrangement, which I will proceed to describe.

$w$ is a lever, whose fulcrum is at $w'$

One end of this lever is connected, by the rod $x$, to a double crank, $y$, which crank operates a cock in each of the pipes U and V.

These cocks are so arranged that, when one is open, the other is closed, and they are moved simultaneously.

The lever $w$ is thrown upward by a spring, seen at $z$, and it is held down by a spring, $a$, and liberated by tripping a trigger, $a'$, which is attached to a hanger, $b$.

When the pressure in the gas-holder has been reduced, and it descends, it draws down the lever, by the cord $c'$, and sets it under the spring, where it remains until the gas-holder is raised by the pressure of the gas, so that it strikes the trigger $a'$ and liberates it.

When this takes place, the cock in the pipe U is closed, and the cock in V is opened.

This operation is equivalent to opening a safety-valve for reducing the pressure, but, in this case, the gas discharged is not wasted or discharged into the air, but utilized as fuel.

The pressure in the gas-holder, or the condition of the apparatus, is indicated by the position of the lever $w$ through a sliding cord or disk-plate.

Attached to the long end of that lever, there is a rod, $d$, (seen behind the casing $e$ in fig. 1, and in dotted line in fig. 3,) to the upper end of which is attached a disk-plate, $f$, upon the face of which the word "shut" is printed or written.

When the lever is tripped, and the end flies up, this die $f$ slides up and covers the space marked "open," so that, when the word "shut" is seen, it is known that no gas is passing into the gas-holder, and that gas is passing through the pipe V, and being discharged under the retort, that is, if gas is being at the time generated.

The gas is discharged from the gas-holder through the pipe $g'$, from whence it enters the service-pipe $h'$, as seen in the drawing.

The red color in fig. 1 indicates the position of the gas-holder when it is raised and ready to trip the lever, the holder being represented in that figure as empty, and as having drawn down the lever by its own weight.

Upon the top of the gas-holder, and also on the top of the purifier, there are small cocks $i\ i$ for discharging the air from those vessels before admitting the gas.

There are also cocks, marked $j$, near the bottom of the washer and the purifier, and also in the tar-receptacle, for drawing off the water and the tar from those vessels, whenever it may be necessary.

$k$ is a receptacle for the drip-water or liquid of condensation from either of the three pipes, U, $g'$, and $h'$, and it is provided with a cock for its discharge, as seen in the drawing.

I claim as new, and desire to secure by Letters Patent—

1. The retort D, in combination with a gas-apparatus, adapted to domestic use, and as described, constructed substantially as set forth.

2. The arrangement whereby the apparatus is made self-regulating, by the pressure of the gas in the gas-holder, substantially as shown and described.

3. Using the surplus gas as fuel, either under the retort for generating gas, or for other purposes, by the automatic arrangement, substantially as described.

4. In combination with a gas-apparatus, the washer and tar-receptacle G, and the purifier K, when the same are constructed and arranged substantially as described.

5. The rake $l$ in the retort, substantially as and for the purpose set forth.

JOHN W. BROWN.

Witnesses:
 FRANK BLOCKLEY,
 ALEX. F. ROBERTS.